(12) United States Patent
Lee

(10) Patent No.: US 12,355,112 B2
(45) Date of Patent: Jul. 8, 2025

(54) RESERVE BATTERY WITH FAST VOLTAGE RISE TIME

(71) Applicant: Seju Engineering Co., Ltd., Daejeon (KR)

(72) Inventor: Won-Bae Lee, Daejeon (KR)

(73) Assignee: Seju Engineering Co., Ltd., Daejeon (KR)

( * ) Notice: Subject to any disclaimer, the term of this patent is extended or adjusted under 35 U.S.C. 154(b) by 135 days.

(21) Appl. No.: 17/768,006

(22) PCT Filed: Oct. 16, 2020

(86) PCT No.: PCT/KR2020/014139
§ 371 (c)(1),
(2) Date: Apr. 11, 2022

(87) PCT Pub. No.: WO2021/080251
PCT Pub. Date: Apr. 29, 2021

(65) Prior Publication Data
US 2024/0097148 A1 Mar. 21, 2024

(30) Foreign Application Priority Data
Oct. 22, 2019 (KR) .................. 10-2019-0131292

(51) Int. Cl.
*H01M 6/38* (2006.01)
*H01M 50/169* (2021.01)
*H01M 50/463* (2021.01)

(52) U.S. Cl.
CPC ........... *H01M 6/38* (2013.01); *H01M 50/169* (2021.01); *H01M 50/463* (2021.01)

(58) Field of Classification Search
CPC .... H01M 6/38; H01M 50/169; H01M 50/463; H01M 50/673; H01M 6/36; Y02E 60/10
See application file for complete search history.

(56) References Cited

U.S. PATENT DOCUMENTS 3,514,339 A    5/1970  Powers
4,031,296 A *  6/1977  Sarbacher ............... H01M 6/38
                                              429/116

(Continued)

FOREIGN PATENT DOCUMENTS

JP        09147882 A     6/1997
KR    1020000013301 A    3/2000

(Continued)

OTHER PUBLICATIONS

International Search Report and Written Opinion of PCT/KR2020/014064.

(Continued)

*Primary Examiner* — Kaity V Chandler
(74) *Attorney, Agent, or Firm* — Youngil Lee

(57) ABSTRACT

The present invention relates to a reserve battery allowing a voltage to quickly rise while being activated by an impact in a normal state in which electricity is not generated and, more specifically, to a reserve battery having a stacked electrode structure, the reserve battery improving the speed of an activation operation and generating a high voltage while being easily manufactured through a structure in which a main body case, instead of an ampoule of metal and glass materials, acts as an ampoule, a cover is attached through welding in a state of directly accommodating an electrolyte, and then a substrate having an anode and a cathode formed thereon is provided as a single layer or a plurality of layers, and a through film, which is broken by pressure and pushes the electrolyte toward the electrodes, is formed at the center of the cover.

8 Claims, 8 Drawing Sheets

(56) References Cited

U.S. PATENT DOCUMENTS

| | | | |
|---|---|---|---|
| 8,372,531 B1* | 2/2013 | Allen | H01M 6/38 |
| | | | 429/117 |
| 8,593,104 B2* | 11/2013 | Rastegar | F02N 11/0866 |
| | | | 320/105 |
| 10,236,516 B2* | 3/2019 | Lee | H01M 6/38 |
| 2006/0040174 A1* | 2/2006 | Peabody | H01M 6/38 |
| | | | 429/114 |
| 2010/0021806 A1* | 1/2010 | Simon | H01M 50/105 |
| | | | 429/116 |
| 2013/0183551 A1* | 7/2013 | Rastegar | H01M 6/5038 |
| | | | 429/62 |
| 2015/0017488 A1* | 1/2015 | Dyer | H01M 6/38 |
| | | | 429/52 |
| 2016/0172713 A1* | 6/2016 | Kumar | H01M 50/191 |
| | | | 228/124.5 |
| 2018/0131010 A1* | 5/2018 | Dyer | H01M 6/38 |
| 2019/0027713 A1* | 1/2019 | Bakker | H01M 4/38 |
| 2020/0280071 A1* | 9/2020 | Yoshii | H01M 10/4235 |

FOREIGN PATENT DOCUMENTS

| | | | | |
|---|---|---|---|---|
| KR | 101326311 B1 * | 10/2001 | | H01M 4/02 |
| KR | 1020030088898 A | 11/2003 | | |
| KR | 1020050055858 A | 6/2005 | | |
| KR | 100758241 B1 | 9/2007 | | |
| KR | 101105268 B1 * | 8/2009 | | H01M 6/36 |
| KR | 1020130086414 A | 8/2013 | | |
| KR | 101306275 B1 | 9/2013 | | |
| KR | 1020150061800 | 6/2015 | | |
| WO | WO-2011005272 A1 * | 1/2011 | | H01M 2/0275 |

OTHER PUBLICATIONS

Office Action received in Korean Patent Application No. 10-2020-0135130 with a mailing date of Jun. 28, 2021.

* cited by examiner

RESERVE BATTERY WITH FAST VOLTAGE RISE TIME

TECHNICAL FIELD

The present invention relates to a reserve battery, which is designed to be normally maintained in a deactivated state in which electricity is not generated and to be activated so as to rapidly rise in voltage in the event of an impact applied thereto, and more particularly to a reserve battery in which a case is replaced with a metal or glass ampule and contains electrolyte therein, a cover is attached to the case through welding, a single board unit or a plurality of board units, each of which includes a positive electrode and a negative electrode, are stacked on the cover, and a breakable membrane, which is broken by pressure so as to allow the electrolyte to splash toward the electrodes, is provided in the center of the cover, thereby making it easy to manufacture the reserve battery, ensuring rapid activation of the battery, and rapidly raising the voltage of the battery.

BACKGROUND ART

Generally, a battery is composed of positive and negative active materials and an electrolyte, which chemically reacts with the active materials to generate electric energy.

A reserve battery is constructed such that a positive electrode, a negative electrode, and an electrolyte, which constitute the above-mentioned general battery, are stored in an isolated state and the electrolyte is immediately transferred to the electrodes when there is a need to use the battery, in order to conserve electrical energy for a period of several decades or longer. In other words, the electrodes and the electrolyte are normally isolated from each other in the deactivated state of the battery so as to conserve electrical energy for a long period of time, and a separating structure for isolating the electrodes from the electrolyte is broken so as to allow the electrolyte to be transferred to the electrodes to thus react with the electrodes, thus activating the battery when used.

A conventional reserve battery is typically constructed such that an ampoule for containing electrolyte therein is made of glass or a metal ampoule includes a fragile glass, silicon or metal membrane formed at one end thereof so as allow the glass ampoule or the fragile membrane to break under a certain condition.

Although such a conventional reserve battery is capable of being operated well at an ambient temperature, there is the case in which the viscosity of the electrolyte increases and thus the electrolyte is not efficiently transferred out of the ampule at a lower temperature. Particularly, in the case of electronic blasting fuses of ammunition for various types of weapon, because electrodes are formed at a side opposite the side of an ampoule at which the ampoule breaks so as to allow the electrolyte to flow out therefrom and thus the time taken for the electrolyte to reach the electrodes increases, there is the case in which the time taken to rise to a desired voltage does not satisfy criteria therefor.

DISCLOSURE

Technical Problem

Therefore, the present invention has been made in view of the above problems, and it is an object of the present invention to provide a reserve battery in which a case is replaced with an ampule and contains electrolyte therein, a cover is attached to the case through welding, a board unit which includes a positive electrode and a negative electrode is mounted on the upper side of the cover, and a breakable membrane, which is broken by pressure so as to allow the electrolyte to splash toward the electrodes, is provided in the center of the cover, thereby making it easy to manufacture the reserve battery, fulfilling rapid activation of the battery, and rapidly raising the voltage of the battery.

Technical Solution

In order to accomplish the above object, the present invention provides a reserve battery characterized by a rapid voltage rise, which is activated by impact, including a box-shaped case having an upper open side and containing an electrolyte therein, a cover coupled to the upper side of the case so as to close the case, the cover including a breakable membrane provided in the center of the cover and split or broken by an impact needle moving from above, and a board unit coupled to an upper side of the cover and including a through hole corresponding to the location of the breakable membrane and a pair of electrodes formed on one surface of the board unit and separated from each other in the circumferential direction of the through hole, electricity being generated by reaction between the electrolyte and the electrodes.

The reserve battery may further include a separator disposed between the cover and the board unit and including an opening flap formed in the center of the separator corresponding to the location of the breakable membrane by an "O"-shaped or "C"-shaped cutoff line, the opening flap being immersed in the electrolyte by force applied thereto from above and being made of a material absorbing the electrolyte.

A projection may be provided between the case and the cover, and may be fused when the case is brought into close contact with the cover and is welded, and the cover may include a blocking plate formed on the lower side thereof so as to prevent the electrolyte in the case from flowing out of the case.

The cover may include a plurality of fixing bars projecting upwards therefrom and a reception recess formed in a center thereof so as to receive the separator, and the board unit may have formed therein support holes, into which the fixing bars are inserted, with a sealing member disposed thereon.

The breakable membrane may have a circular groove having a "V"-shaped cross section.

The board unit may include a plurality of board units stacked.

The breakable membrane may be made of a material having such weak strength as to break by impact of the impact needle.

Each of the plurality of board units may include a positive electrode and a negative electrode selectively and respectively formed on upper and lower surfaces thereof such that the positive electrode of one of the plurality of board units faces the negative electrode of an adjacent one of the plurality of board units, and the reserve battery further include a separator disposed between adjacent board units such that the adjacent board units are connected to each other in series when the separator absorbs the electrolyte.

The reserve battery may further include the impact needle capable of passing through the through hole, a retainer disposed across the through hole in an uppermost board unit, among the plurality of board units, so as to temporarily hold the impact needle, and an additional cover configured to cover the uppermost board unit, the impact needle, and the retainer, and the impact needle may be released from the retainer and may strike the breakable membrane by setback.

In an electrode board in which a positive electrode and a negative electrode are formed on the same surface, the lead wires from the electrodes are disposed the board and connected to the electrode pads in an insulated state. In a stacked electrode boards in which a positive electrode and a negative electrode are respectively formed on the two opposite surfaces of the board, the positive electrode and the negative electrode of each of the boards are electrically connected to each other via the board, and the lead wires of the uppermost electrode and the lowermost electrode are disposed in the board and connected to each other an electrode pad, thereby completing the manufacture of the battery. Here, in order to form the electrode pads on the same surface of the uppermost board or the lowermost board, a via hole may be formed between the uppermost board and the lowermost board.

Advantageous Effects

Because the reserve battery according to the present invention is constructed such that the cover is attached to the case containing an electrolyte therein through welding and then the board unit is mounted on the cover, it is easy to manufacture the reserve battery. Furthermore, because the cover is provided in the center thereof with the breakable membrane, which is split or broken by pressure so as to allow the electrolyte to splash upwards therethrough, and the type of separator is changed depending on the physical usage environment, it is possible to ensure very rapid activation of the reserve battery.

In addition, because the electrolyte is effectively transferred to the electrodes even when there is no setback or rotative force in a low-temperature environment, it is possible to ensure malfunction-free and rapid activation of the reserve battery.

Furthermore, it is possible to easily obtain a desired voltage by adjusting the number of board units and stacking the plurality of board units such that the electrodes in the board units are connected to each other in series.

BEST MODE

Hereinafter, the structure of the reserve battery characterized by a rapid voltage rise according to the present invention will be described in detail with reference to the accompanying drawings.

Figure 1:
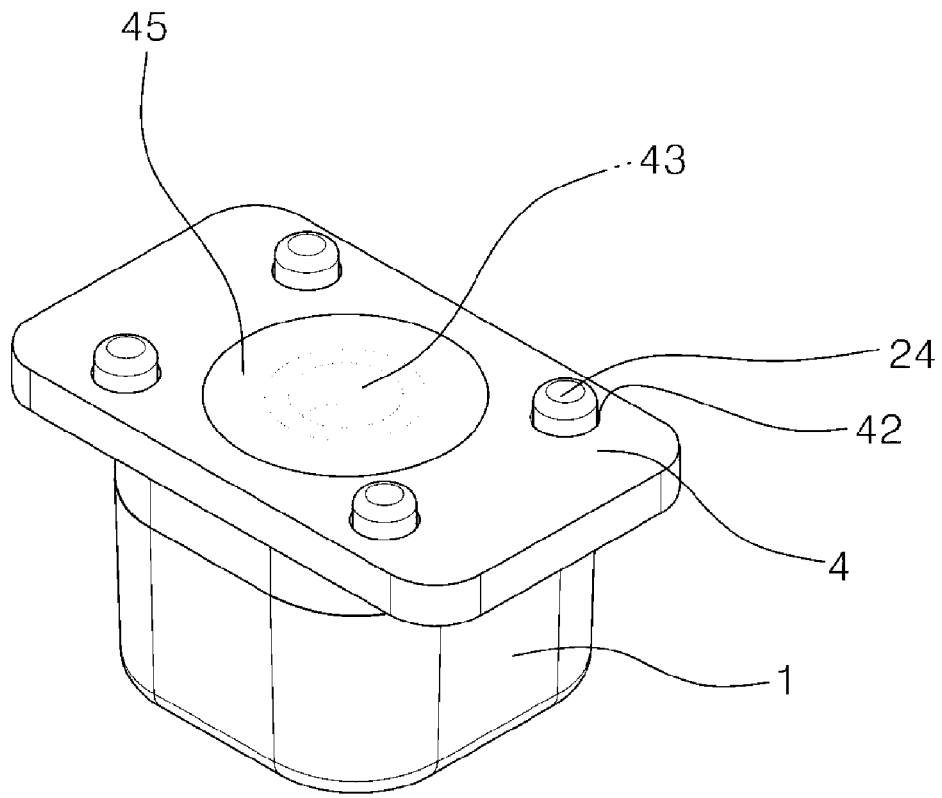
FIG. 1 is a perspective view illustrating the appearance of a reserve battery according to an embodiment of the present invention.
Figure 2:
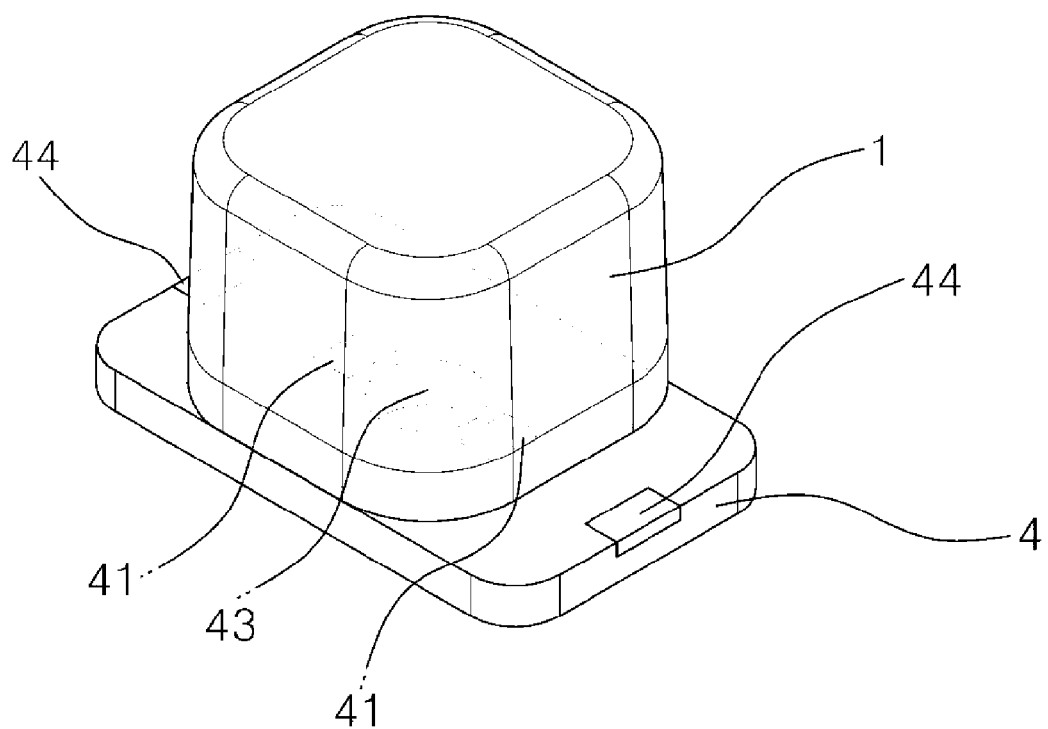
FIG. 2 is a rear perspective view illustrating the rear surface of the reserve battery according to the embodiment of the present invention.
Figure 3:
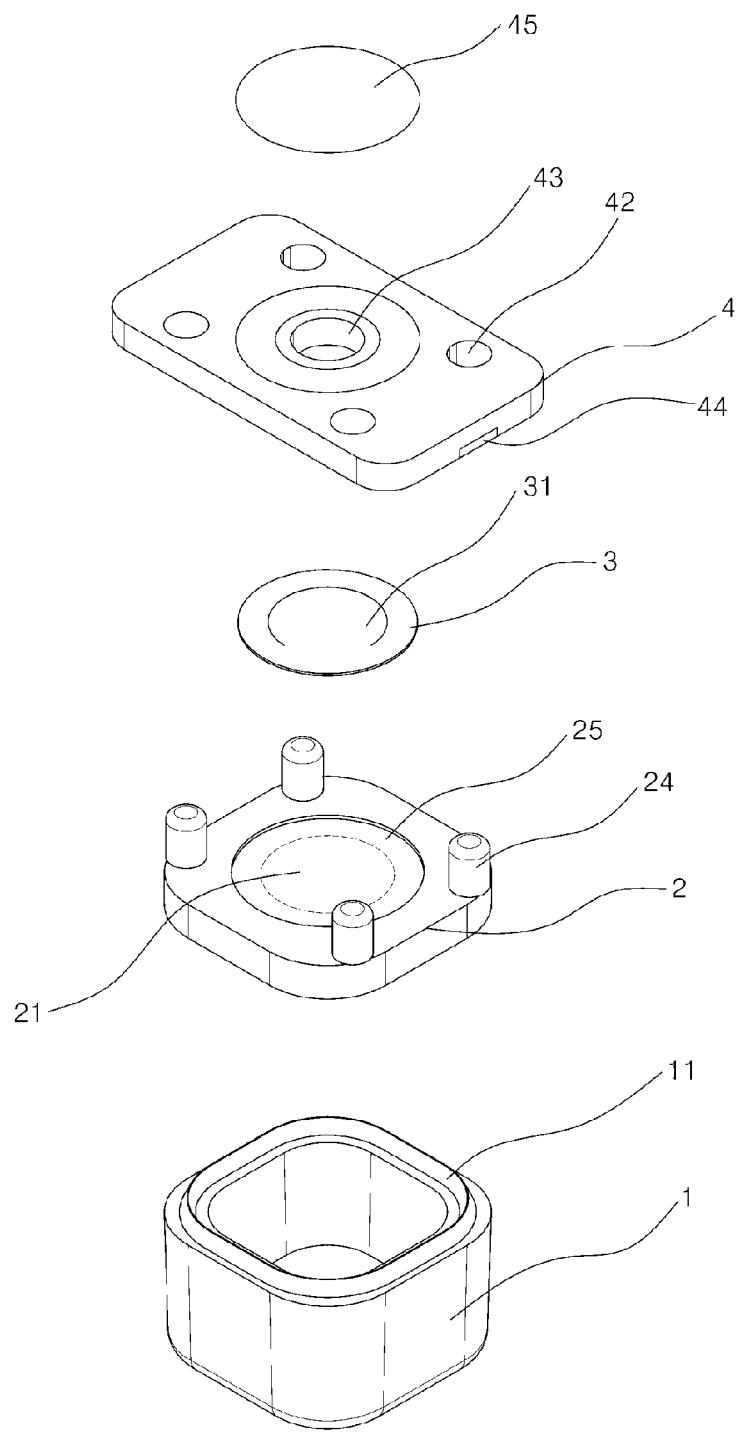
FIG. 3 is an exploded perspective view of the reserve battery according to the embodiment of the present invention.
Figure 5:
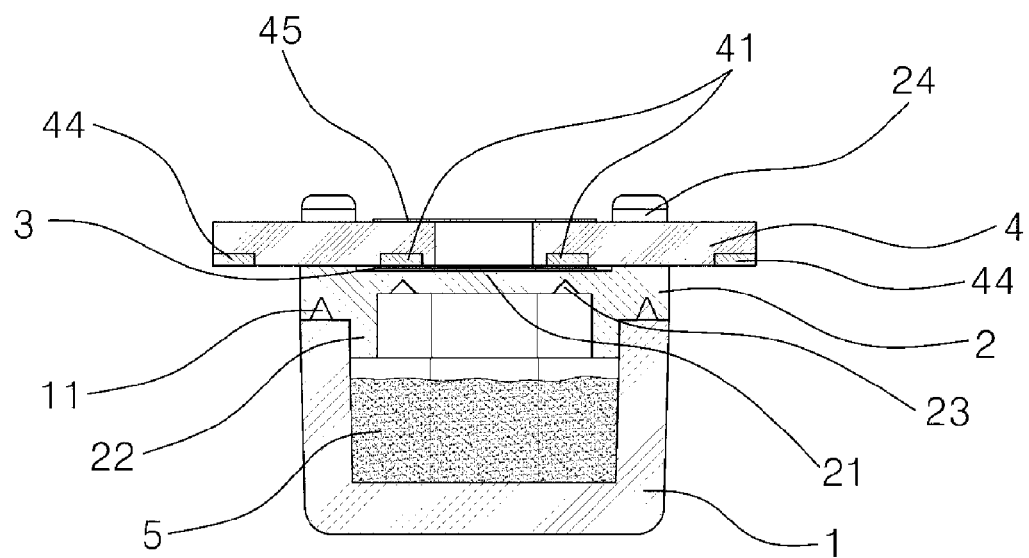
FIG. 5 is a side cross-sectional view of the reserve battery according to an embodiment of the present invention.

FIG. 1 is a perspective view illustrating the appearance of the reserve battery according to the present invention. FIG. 2 is a rear perspective view illustrating the rear surface of the reserve battery according to the present invention. FIG. 3 is an exploded perspective view of the reserve battery according to the present invention. FIG. 5 is a side cross-sectional view of the reserve battery according to the present invention. The reserve battery according to the present invention, which is activated upon impact, includes a case 1, a cover 2, a separator 3, and a board unit 4, which are the substantial components of the reserve battery.

The case 1 is a box-shaped structure having an upper open side, which constitutes the body of the reserve battery and stores an electrolytic solution therein. The case 1 is made of metal, synthetic resin or the like, which is not subjected to corrosion caused by reaction with the electrolyte, so the electrolyte does not leak even in the event of an impact or the like.

The cover 2 is coupled to the upper side of the case 1 so as to cover the upper side and to close the interior space in the case 1 in order to prevent leakage of the electrolyte. The center of the cover 2 is provided with a breakable membrane 21, which is split or broken by force applied from above. Like the case 1, the cover 2 is also made of metal, synthetic resin or the like, which is not vulnerable to corrosion caused by reaction with the electrolyte. Preferably, the case 1 and the cover 2 are made of a metal or plastic material such that the cover 2 can be fused to the case 1 through welding, and the breakable membrane 21 is made of a different material.

To this end, the contacting portion of the base 1 that is brought into contact with the cover 2 is provided with a projection 11, which is fused so as to couple the cover 2 to the case 1, as illustrated in FIG. 3. The cover 2 is fused to the case 1 via the projection 11 by applying a high-frequency wave thereto in the state in which the cover 2 is in close contact with the upper side of the case 1 and thus by applying heat to the contacting portion.

Although the accompanying drawings illustrate an embodiment in which the projection 11 is formed on the case 1, the projection 11 may also be formed on the cover 2 in order to obtain the same effect.

The electrolyte 5 is injected into the case 1 prior to the welding operation. In order to prevent the electrolyte 5 in the case 1 from leaking outwards during the welding operation, the cover 2 is provided at the lower side thereof with a blocking plate 22, which projects downwards while being in contact with the inner wall of the case 1.

The breakable membrane 21 is split or broken by means of an impact needle 6, which is moved downwards from above by setback or the force of a spring, so as to allow the electrolyte 5 contained in the case 1 to flow outwards. The breakable membrane 21 is provided in the hole formed through the central area of the cover 2, and is made of any of various materials, which is capable of being split or broken by relatively low force, that is, by contact with the impact needle 6, so as to be split or broken upon application of impact to the impact needle 6. Preferably, the lower surface of the breakable membrane 21 is provided therein with a groove 23 having a "V"-shaped cross-section along a circular line defining the contact area with the impact needle 6.

Specifically, because the strength of the breakable membrane 21 is decreased by means of the groove 23 having a "V"-shaped cross section, when an impact is applied by the impact needle 6, the portion of the breakable membrane 21 corresponding to the V-shaped groove 23 breaks, and the breakable membrane 21 is pushed toward the inside of the case 1 together with the impact needle 6, thereby pushing the electrolyte 5 out of the case 1.

By virtue of this structure, it is possible to quickly discharge the electrolyte 5 and thus quickly activate the battery. Here, because the separator 3 capable of absorbing the electrolyte 5 is positioned between the cover 2 and the board unit 4, it is possible to allow the electrolyte 5 to easily react with the electrodes.

The separator 3 is made of a material capable of absorbing the electrolyte 5. The separator 3 is normally positioned so as to cover the upper side of the cover 2 to thus prevent the electrodes 41 in the board unit 4 thereabove from coming into contact with the cover 2 and from being electrically connected thereto before use of the battery.

For disposition of the separator 3, a reception recess 25 is formed in the center of the upper surface of the cover 2 so as to receive the separator 3 therein. Furthermore, an opening flap 31, which is immersed in the electrolyte 5 by force applied to the impact needle 6 from above, is formed in the separator 3 at a position corresponding to the breakable membrane 21 so as to absorb the electrolyte 5 to thus assist contact and reaction with the electrodes 41. As illustrated in FIG. 3, a "C"-shaped cutoff line is formed in the separator 3 so as to form the opening flap such that, when the opening flap 31 is pushed downwards, the opening flap 31 is easily cut and opened and is then immersed in the electrolyte 5.

Figure 4:
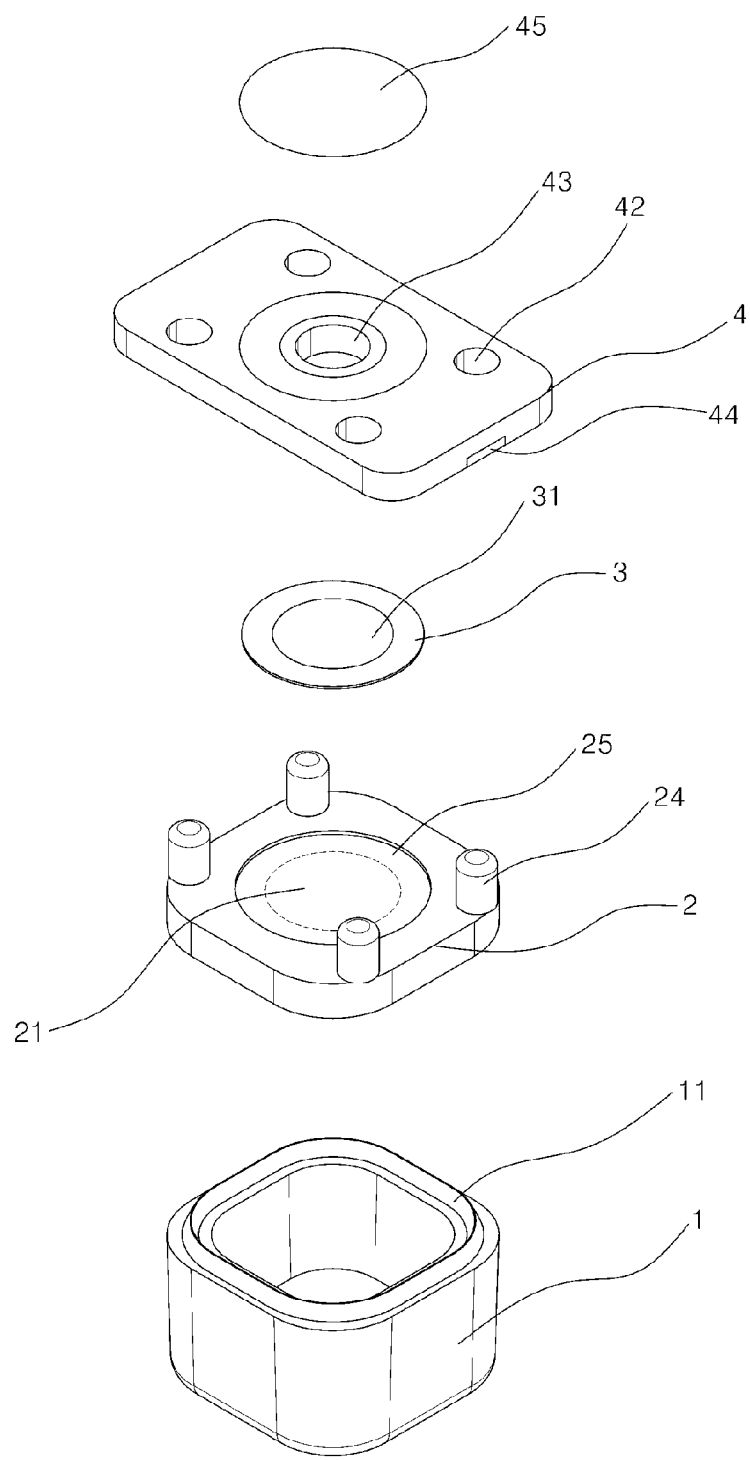
FIG. 4 is an exploded perspective view of a reserve battery according to a modification of the present invention.

FIG. 4 is an exploded perspective view of a modification of the present invention. In the modification, an "O"-shaped cutoff line is formed in the separator 3 so as to form the opening flap 31.

In this way, the opening flap 32 of the separator 3 may be selectively provided with the "C"-shape cutoff line or the "O"-shaped cutoff line as needed. In the case of the "C"-shaped cutoff line, when the force that is applied to the impact needle 6 is low and the rotational speed of the impact needle 6 is low, the opening flap 31 is cut and opened and is immersed in the electrolyte 5, with the result that the opening flap 32 is brought into contact with the electrolyte 5 and thus absorbs the electrolyte 5. Accordingly, this type of opening flap 31 is operable at a low temperature. Meanwhile, in the case of the "O"-shaped cutoff line, when the impact needle 6 is struck at a high speed, the "O"-shaped opening flap 31 is completely separated from the separator 3 and then strikes the electrolyte 5, thereby causing the electrolyte to splash upwards. Accordingly, this type of opening flap 31 is used when there is need for a very rapid voltage rise.

The board unit 4, which has a PCB structure, is coupled to the upper side of the separator 3, and includes a through hole 43, formed at the location corresponding to the breakable membrane 21, and a pair of electrodes, that is, a positive electrode and a negative electrode, which are formed in the same surface of the board unit 4 so as to be symmetrically disposed based on the through hole 43 and to face the cover 2. Here, contact and reaction of the electrodes with the electrolyte 5 generates electricity. The generated electricity is output through electrode pads 44, which are formed at the outer periphery of the board unit 4, and is sufficiently raised in voltage or maintained at a certain voltage using an additional circuit so as to be used in a bullet including an electronic blasting fuse.

Although the drawings illustrate the pair of electrode pads 44, which are disposed at two opposite sides of the board unit 4, the pair of electrode pads 44 may be disposed at different locations of the board unit 4 in the state of being spaced apart from each other.

Here, a sealing member 45, which is made of a metal or rubber membrane, is attached to the portion of the board unit 4 around the through hole 43 so as to seal the through hole 43.

Figure 6:
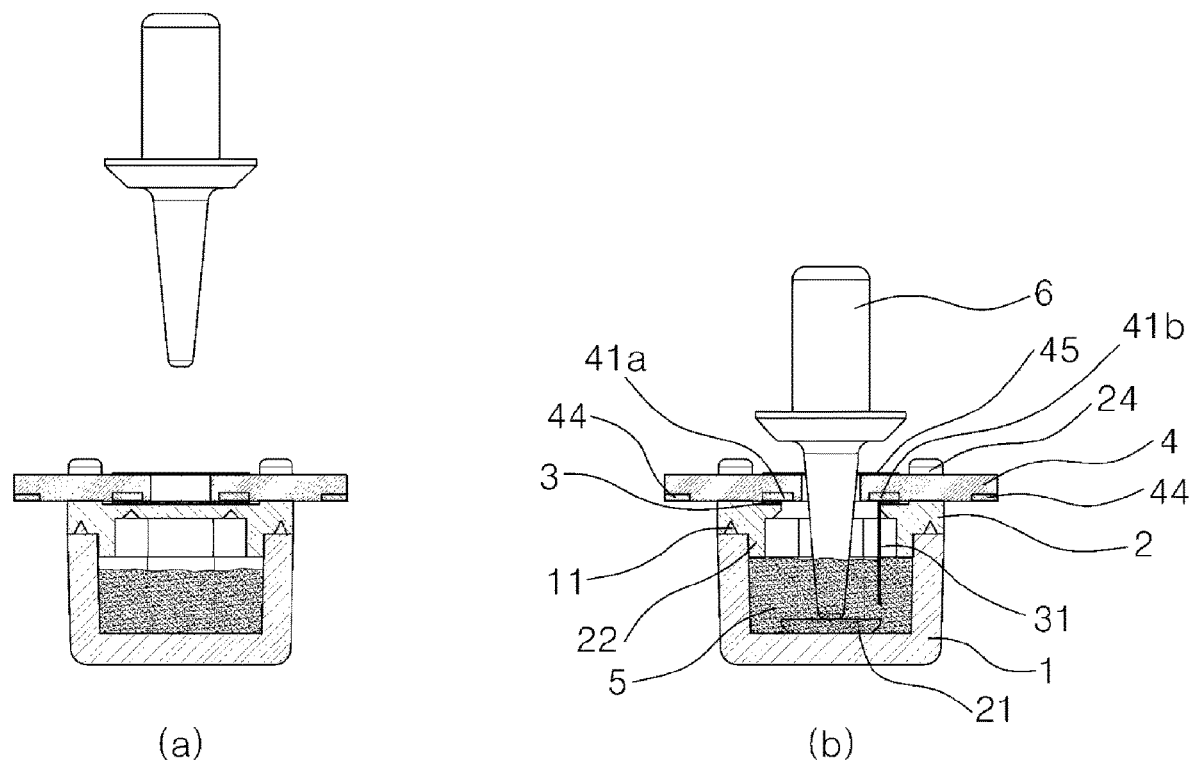
FIG. 6 is a view illustrating an activation procedure of the reserve battery according to an embodiment of the present invention.

FIG. 6 is a view illustrating a procedure of activation of the reserve battery according to the present invention. Here, the sealing member 45, the through hole 43 in the board unit 4, the opening flap 31 of the separator 3, and the breakable membrane 21 are positioned in the path of movement of the impact needle 6, and are normally maintained in the pre-activation state shown in FIG. 6(a). The impact needle 6 is moved through the through hole 43 due to shooting impact of a bullet or the elastic force of a spring, as illustrated in FIG. 6(b). At this time, when the opening flap 31 of the separator 3 is formed by the "O"-shaped cutoff line, the sealing member 45 is perforated and the opening flap 31 is cut and opened by the impact needle 6, and then the breakable membrane 21 is split or broken by the impact needle 6 and is immersed in the electrolyte 5. Consequently, the electrolyte splashes upwards due to the pressure of the impact and the centrifugal force caused by rotation of the bullet. The splashed electrolyte is absorbed into the separator 3 and comes into contact with the pair of electrodes in the board unit 4, with the result that electricity is generated by the board unit 4 through the reaction between the electrolyte and the electrodes. Meanwhile, when the opening flap 31 is formed in the separator 3 by the "C"-shaped cutoff line, a portion of the opening flap 31 is immersed in the electrolyte 5 together with the impact needle 6 and absorbs the electrolyte, with the result that the electrolyte comes into contact with the electrodes, thereby generating electricity.

For alignment of the through hole 43 in the board unit 4, the opening flap 31 of the separator 3, and the breakable membrane 21, a plurality of fixing bars 24 are formed on the upper side of the cover 2 so as to project therefrom, and the board unit 4 has formed therein support holes 42 into which respective fixing bars 24 are inserted.

Although the drawings illustrate an embodiment in which a total of four fixing bars 24 are formed at respective corners of the square cover 2, the present invention is not limited thereto.

Figure 7:
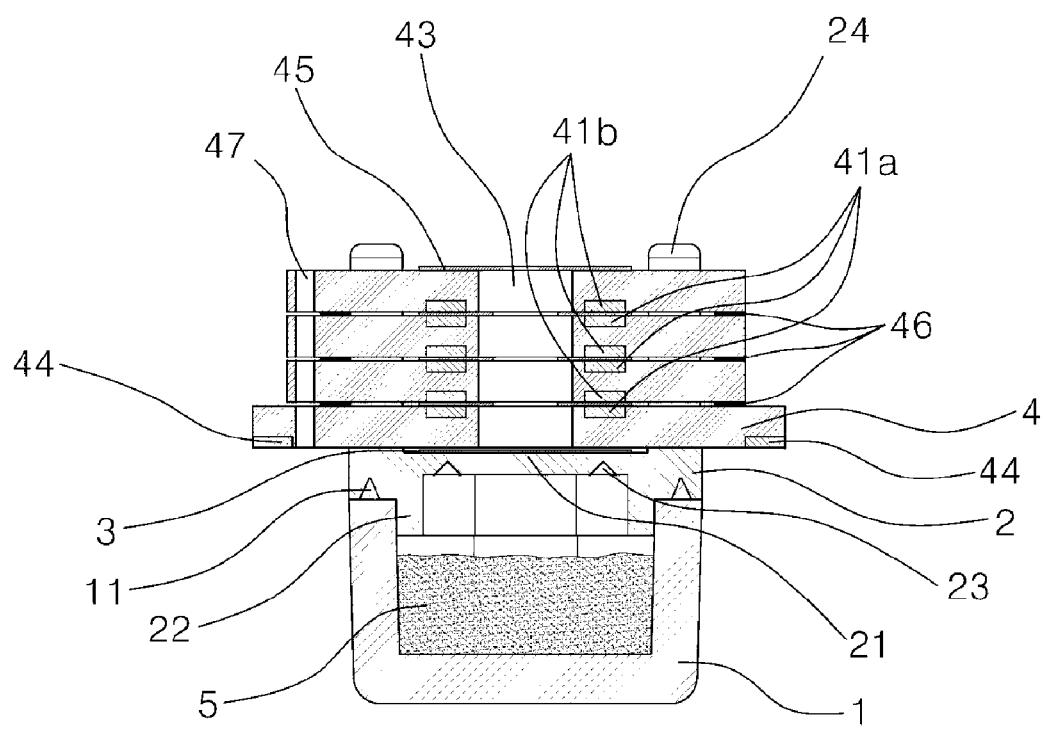
FIG. 7 is a side cross-sectional view of a reserve battery according to an embodiment of the present invention in which board units are stacked.

FIG. 7 is a side cross-sectional view of a reserve battery according an embodiment of to the present invention in which multiple board units are stacked. In this embodiment, a plurality of battery cells are connected in series using the above-mentioned structure. Specifically, a plurality of board units, each of which is provided on a first surface thereof with a negative electrode and on a second surface thereof with a positive electrode, are stacked in a multi-layered arrangement such that a negative electrode provided at the first surface of each of the board units faces a positive electrode provided at the second surface of an adjacent board unit in order to generate a higher voltage.

Specifically, after the breakable membrane 21 is split or broken, the electrode splashes upwards through the through hole 43 and infiltrates between the stacked board units, thereby generating electricity. Here, it is possible to generate a desired voltage of electricity by changing the number of board units that are stacked.

A positive electrode 41a and a negative electrode 41b are selectively formed on respective ones of the central portions of the upper and lower surfaces of each of the stacked board units 4 such that the positive electrode 41*a* of one board unit faces the negative electrode 41*b* of an adjacent board unit, with the result that the positive electrodes 41*a* and the negative electrodes 41*b* are electrically connected to each other in series. Here, because the uppermost board unit and the lowermost board unit, among stacked board units connected to each other in series, are incapable of generating electricity even when the uppermost board unit and the lowermost board unit include electrodes, the uppermost board unit and the lowermost board unit do not need to include electrodes.

A pair of adjacent board units are provided therebetween with a seating portion for accommodating the separator 3 therein, and the separator 3 having the "O"-shaped cutoff line is received in the seating portion, thereby preventing an electrical short from occurring between the positive electrode 41*a* and the negative electrode 41*b*, which are adjacent to each other. Because the separator 3 contains the electrolyte, it is possible to generate electricity for a long period of time.

The serial-connection-type battery cell may be used by electrically connecting the electrode pads of the uppermost board unit to the electrode pads of the lowermost board unit. The electrode pads are formed at corresponding areas of the upper portions or the lower portions of the stacked board units, and via holes 47 are formed through the corresponding areas of the upper portions or the lower portions of the stacked board units such that the electrode pads are electrically connected to each other.

Specifically, in order to connect the stacked board units, each of which serves as a battery cell, to each other in series, the electrode pads must be respectively connected to the positive (+) electrode of the uppermost board unit and the negative (−) electrode of the lowermost board unit. Accordingly, the via hole 47 is formed through all of the stacked board units so as to electrically connect the stacked board units to each other, thereby connecting the positive electrode of the uppermost board unit to the electrode pad of the lowermost board unit.

Figure 8:
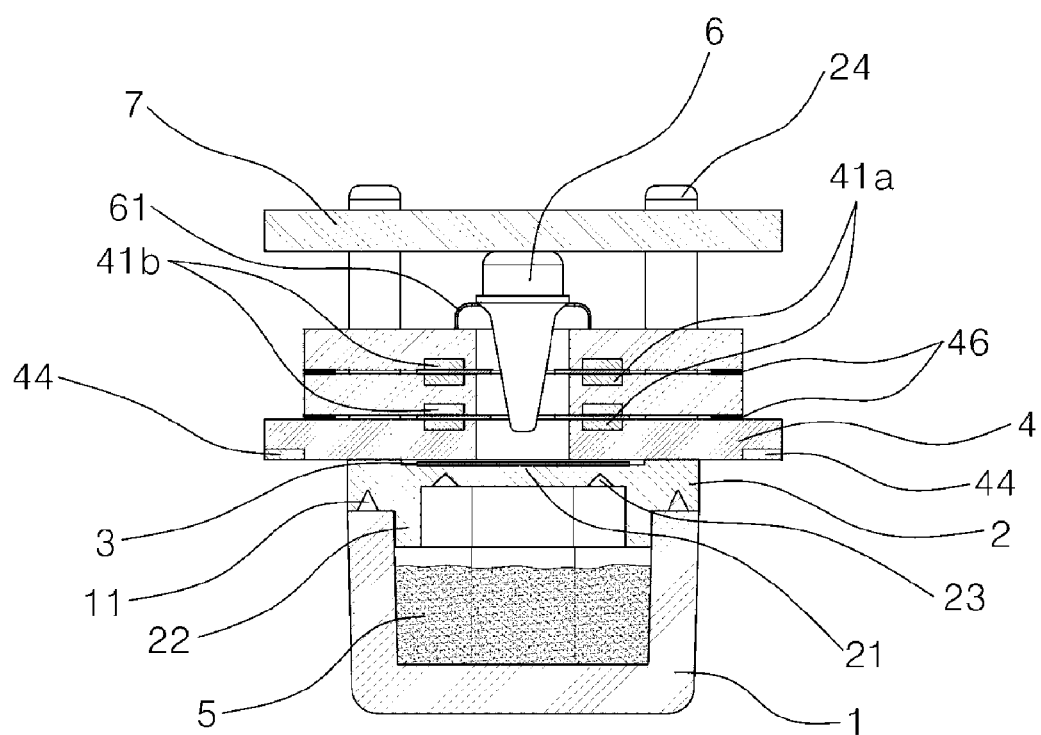
FIG. 8 is a side cross-sectional view of a reserve battery according to an embodiment of the present invention in which board units are stacked and into which an impact needle is incorporated.

FIG. 8 is a side cross-sectional view of a reserve battery according to an embodiment of the present invention in which board units are stacked in the above-described manner and the impact needle is incorporated.

Specifically, the reserve battery is constructed such that a retainer 61 such as a spring is provided on the sealing member of the uppermost board unit so as to temporarily retain the impact needle 6 and an additional cover 7 is provided on the uppermost board unit so as to seal the uppermost board unit including the impact needle 6.

When the board units are stacked in this way, an adhesive material 46 such as epoxy is applied around the stacked board units so as to form a seal between adjacent board units and between the board unit and the cover. In operation, the impact needle 6 is released from the retainer 61 by setback and strikes the breakable membrane 21.

The invention claimed is:

1. A reserve battery having a rapid voltage rise and activated by impact, comprising:
    a box-shaped case having an upper open side and containing an electrolyte therein;
    a cover coupled to the upper side of the case so as to close the case, the cover including a breakable membrane provided in a center of the cover and split or broken by an impact needle moving from above; and
    a board unit coupled to an upper side of the cover and including a through hole corresponding to a location of the breakable membrane and a pair of electrodes formed on one surface of the board unit and separated from each other in a circumferential direction of the through hole, electricity being generated by reaction between the electrolyte and the electrodes.

2. The reserve battery according to claim 1, further comprising a separator disposed between the cover and the board unit and including an opening flap formed in a center of the separator corresponding to a location of the breakable membrane by an "O"-shaped or "C"-shaped cutoff line, the opening flap being immersed in the electrolyte by force applied thereto from above and being made of a material absorbing the electrolyte.

3. The reserve battery according to claim 1, wherein a projection is provided between the case and the cover and is fused when the case is brought into close contact with the cover and is welded, and
    wherein the cover includes a blocking plate formed on a lower side thereof so as to prevent the electrolyte in the case from flowing out of the case.

4. The reserve battery according to claim 2, wherein the cover includes a plurality of fixing bars projecting upwards therefrom and a reception recess formed in a center thereof so as to receive the separator, and
    wherein the board unit includes support holes into which the fixing bars are inserted and a sealing member disposed thereon.

5. The reserve battery according to claim 1, wherein the breakable membrane has a circular groove having a "V"-shaped cross section.

6. The reserve battery according to claim 1, wherein the board unit includes a plurality of board units stacked.

7. The reserve battery according to claim 6, wherein each of the plurality of board units includes a positive electrode and a negative electrode selectively and respectively formed on upper and lower surfaces thereof such that the positive electrode of one of the plurality of board units faces the negative electrode of an adjacent one of the plurality of board units, and
    wherein the reserve battery further comprises a separator disposed between adjacent board units such that the adjacent board units are connected to each other in series when the separator absorbs the electrolyte.

8. The reserve battery according to claim 7, further comprising the impact needle capable of passing through the through hole, a retainer disposed across the through hole in an uppermost board unit, among the plurality of board units, so as to temporarily retain the impact needle, and an additional cover configured to cover the uppermost board unit, the impact needle, and the retainer,
    wherein the impact needle is released from the retainer and strikes the breakable membrane by setback.

* * * * *